United States Patent

Takanashi

[11] Patent Number: 5,771,115
[45] Date of Patent: Jun. 23, 1998

[54] OPTICAL SCANNER

[75] Inventor: Kenichi Takanashi, Chiba-ken, Japan

[73] Assignee: Ricoh Company, Ltd., Tokyo, Japan

[21] Appl. No.: 660,594

[22] Filed: Jun. 11, 1996

[30] Foreign Application Priority Data

Jun. 20, 1995 [JP] Japan .................................... 7-153681

[51] Int. Cl.⁶ .................................................. G02B 26/08
[52] U.S. Cl. .......................... 359/208; 359/205; 359/214; 359/216
[58] Field of Search ..................................... 359/196, 197, 359/205, 206, 207, 208, 212, 213, 214, 216, 217, 218, 219; 347/250, 256, 260, 261; 250/234, 235, 236

[56] References Cited

U.S. PATENT DOCUMENTS 5,233,454  8/1993  Sakuma et al. .......................... 359/196
5,666,220  9/1997  Sakuma .................................... 359/205

FOREIGN PATENT DOCUMENTS 56-167118  12/1981  Japan ...................................... 359/212
3-274016   12/1991  Japan ...................................... 359/197
4-175718    6/1992  Japan ...................................... 359/197

*Primary Examiner*—Paul M. Dzierzynski
*Assistant Examiner*—Darren E. Schuberg
*Attorney, Agent, or Firm*—Oblon, Spivak, McClelland, Maier & Neustadt, P.C.

[57] ABSTRACT

An optical scanner having a light source for emitting a light beam, an optical deflector having a deflecting-reflecting face for deflecting the light beam at a constant angular speed and a scan image forming mirror for reflecting the deflected light beam to a surface to be scanned at a constant speed. The light source and the optical deflector are provided on opposite sides across the scan image forming mirror and the light beam is illuminated toward the deflecting-reflecting face of the optical deflector through an emitted-light transmitting portion provided outside an effective area of the scan image forming mirror.

15 Claims, 4 Drawing Sheets

OPTICAL SCANNER

BACKGROUND OF THE INVENTION

1. Field of the Invention

The present invention relates to an optical scanner, and more specifically to an optical scanner using a scan image forming mirror.

2. Description of the Related Art

An optical scanner, in which a light beam from a light source is deflected at a constant angular speed by an optical deflector having a deflecting-reflecting face and then the deflected light beam is focused as a light spot on a surface to be scanned by a scan image forming optical system to scan the surface at a constant speed, is widely known in relation to an image forming apparatus such as a digital copying machine, or an optical printer.

As the aforementioned scan image forming optical system, an fθ lens is generic, but the use of a concave mirror with an image forming function of focusing a deflected light beam onto a surface to be scanned as a light spot and a function of making the moving speed of the light spot, that is, a scan speed uniform (called an fθ function), that is, the use of a scan image forming mirror has recently been intended.

The fθ lens transmits the deflected light beam from the optical deflector toward the surface to be scanned, while the scan image forming mirror reflects the deflected light beam so that it turns back toward the optical deflector. Therefore, with the turn of this optical path, the floor area of the optical layout of the optical scanner, that is, the size of the optical layout viewed from the top can effectively be reduced compared with the case where the fθ lens is used.

The light beam from the light source is generally incident toward the optical deflector in a direction crossing the optical axis of the scan image forming optical system at a right angle or in a direction forming an acute angle with respect to the optical axis. In the optical scanner using an fθ lens, since the optical deflector and the surface to be scanned are on opposite sides across the fθ lens, generally there is a sufficient space between the light source and the surface to be scanned.

However, in the optical scanner using a scan image forming mirror, the surface to be scanned and the optical deflector are located on the same side as the scan image forming mirror. Therefore, in a case where a light beam from a light source is incident on the deflector in a direction crossing the optical axis of the scan image forming mirror at a right angle, there is the possibility that the light source and the surface to be scanned will get close to each other.

The surface to be scanned is generally the outer peripheral surface of a photosensitive body having photoconductivity, and a charger, a developer, and a transfer unit need to be disposed around the photosensitive body. If, in a state such as this, the light source and optical devices attached to this light source are disposed near the photosensitive body, a limitation on the layout of the optical scanner will become large.

SUMMARY OF THE INVENTION

The present invention has been made in view of the aforementioned circumstances and the object of the present invention is to provide a novel optical scanner which uses a scan image forming mirror and where the degree of freedom of layout is large.

The optical scanner of the present invention is constituted by an optical scanner in which a light beam from a light source is deflected at a constant angular speed by an optical deflector having a deflecting-reflecting face and then the deflected light beam is reflected by a scan image forming mirror to scan a surface to be scanned at a constant speed.

The optical scanner according to the present invention is characterized in that the light source and the optical deflector are provided on opposite sides across the scan image forming mirror and the light beam is illuminated toward the deflecting-reflecting face of the optical deflector through an emitted-light transmitting portion provided outside an effective area of image forming mirror.

In this case, synchronous light detecting means, which detects the deflected light beam at a starting side of the optical scanning and generates a synchronous signal for the optical scanning, can be constructed so as to detect the deflected light beam at a received-light transmitting portion provided outside the effective area of the scan image forming mirror. Detecting the deflected light beam at the received-light transmitting portion is intended to include both a case where the light beam transmitted through the received-light transmitting portion is detected and a case where the deflected light is detected at the position of the received-light transmitting portion.

In the case where the received-light transmitting portion is provided as described above, the emitted-light transmitting portion and the received-light transmitting portion may be separated at the longitudinal opposite end portions of the scan image forming mirror, respectively. In some cases, conversely, the emitted-light transmitting portion and the received-light transmitting portion may be close to each other or integrally formed.

In a preferred form of the present invention, the light beam from the light source may be formed on the deflecting-reflecting face of the rotary polygon mirror as a line image longer in a horizontal scan-corresponding direction, and the deflected light beam may be focused on the surface to be scanned as a light spot by the anamorphic scan image forming mirror or the scan image forming mirror and a long lens for correcting for a fall of the deflecting-reflecting face.

The aforementioned horizontal scan-corresponding direction is a direction which corresponds in parallel with the horizontal scanning direction on a virtual optical path where, among optical paths leading from a light source to a surface to be scanned, the optical path giving a light spot having an image height of zero is linearly expanded. The direction which corresponds in parallel with the vertical scanning direction on the aforementioned virtual optical path is referred to as a vertical scan-corresponding direction.

The optical scanner in the aforementioned preferred form of the present invention has a function of correcting for a so-called "a fall of a surface" of the deflecting-reflecting face of the rotary polygon mirror which is the optical deflector. The rotary polygon mirror is referred to as a rotary type polygon mirror having two or more deflecting-reflecting faces.

On the other hand, in another preferred form of the present invention, a rotary single surface mirror (so-called tenon mirror) having no fall of a surface can be used as the optical deflector in addition to the rotary polygon mirror.

The emitted-light transmitting portion and the recieved-light transmitting portion can be formed in the scan image forming mirror as an opening portion or a cutout portion. In some cases, the scan image forming mirror itself can be formed with transparent material, and the emitted-light transmitting portion and the received-light transmitting portion can be formed by not forming reflecting films in the portions which should become the light transmitting portions.

In still another preferred form of the present invention, a lens for converging a divergent light beam emitted from the light source can be provided at the emitted-light transmitting portion of the scan image forming mirror.

In a further preferred form of the present invention, an anamorphic lens is provided at the emitted-light transmitting portion of the scan image forming mirror, the anamorphic lens being used for changing a divergent light beam emitted by the light source to a collimated light beam or a diverged or converged light beam in the horizontal scan-corresponding direction and converging the light beam in a vertical scan-corresponding direction so that the light beam is formed on the deflecting-reflecting face of the rotary polygon mirror as a line image longer in the horizontal scan-corresponding direction.

Providing the lens in the emitted-light transmitting portion is intended to include both a case where a separate lens is attached to the emitted-light transmitting portion of the scan image forming mirror and a case where the aforementioned lens is formed integrally with the scan image forming mirror as part of the scan image forming mirror.

In a further preferred form of the present invention, an optical axis of the lens provided at the emitted-light transmitting portion can be parallel to a plane crossing an rotation axis of the deflecting-reflecting face at a right angle, and the light source can be shifted from the optical axis so that the light beam transmitted through the lens is tilted at a predetermined angle with respect to the plane.

In an additional form of the present invention, a lens for focusing the light beam transmitted through the received-light transmitting portion toward the synchronous light detecting means can be provided at the received-light transmitting portion, and the synchronous light detecting means can be provided at the received-light transmitting portion. Even in this case, the lens may be attached to the scan image forming mirror or internally formed with the scan image forming mirror.

Moreover, the position of the light source can be adjusted in a direction of an optical axis of the lens provided at the emitted-light transmitting portion.

As described above, in the optical scanner of the present invention, the light source and the optical deflector are provided on opposite sides across the scan image forming mirror and therefore the light beam emitted from the light source is transmitted through the emitted-light transmitting portion of the scan image forming mirror and is incident on the deflecting-reflecting face of the optical deflector.

Further objects of and of the present invention will apparent from the following description of the preferred embodiments of the invention as illustrated in the accompanying drawings.

DESCRIPTION OF THE PREFERRED EMBODIMENTS

A concrete embodiment of the present invention will hereinafter be described.

Figure 1A:
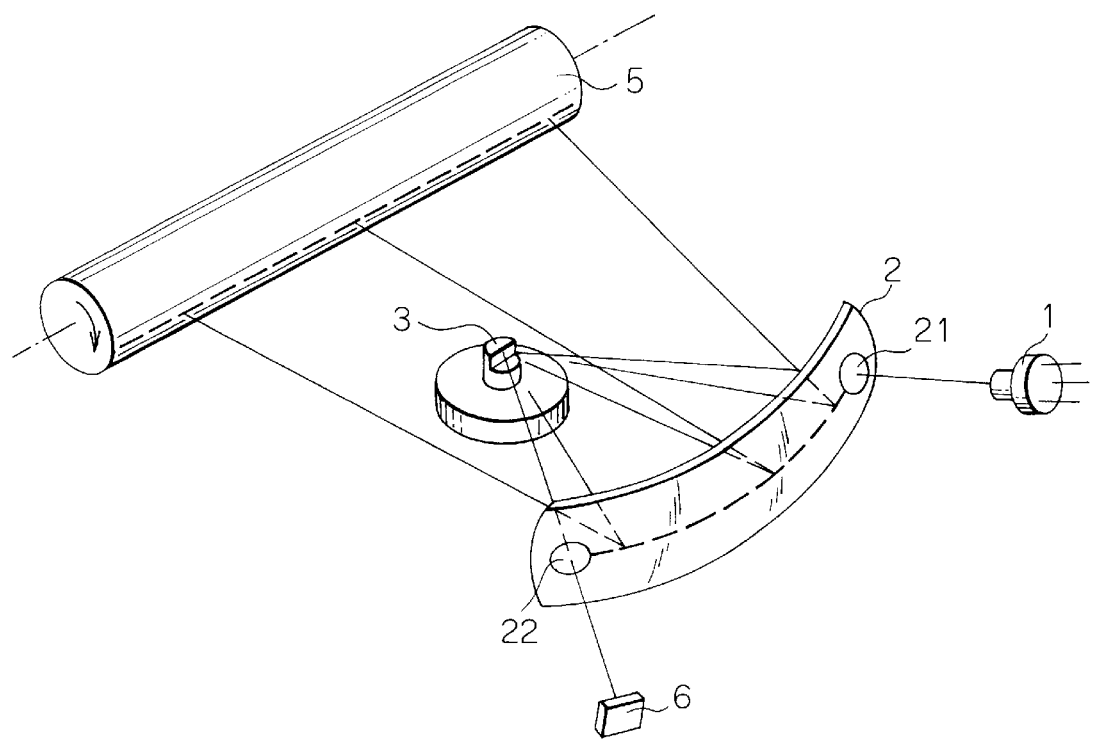
FIGS. 1a, 1b, and 1c are diagrams for explaining an embodiment of the present invention.

In FIG. 1a, a light beam from a light source 1 which is an LD or LED is changed to a collimated light beam by a condenser lens 21 formed in the emitted-light transmitting portion formed in the effective area (reflecting face portion not contributing to the optical scanning of a face to be scanned) of a scan image forming mirror 2 and is incident on the deflecting-reflecting face of an optical deflector 3.

The optical deflector 3 is constituted by a rotary single surface mirror (tenon mirror) having a single deflecting-reflecting face. The deviation of the rotation axis of the surface of the single surface mirror has been corrected with a high degree of accuracy, so there is no fall of the surface in the optical deflector 3.

The light beam, deflected by the deflecting-reflecting face of the optical deflector 3, is changed to a deflected light beam at a constant angular speed, as the optical deflector 3 is rotated at a constant speed. If the deflected light beam is incident on the deflecting-reflecting face of the scan image forming mirror 2 and is reflected by the deflecting-reflecting face, the light beam will be focused as a light spot on the outer peripheral surface of a photosensitive body 5 which has been set as a surface to be scanned, by the image forming operation of the scan image forming mirror 2, and the surface to be scanned will be scanned at a constant speed by the fθ function of the scan image forming mirror 2.

Figure 1B:
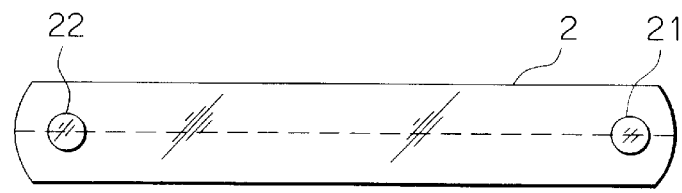

As shown in FIG. 1b, in the scan image forming mirror 2, a condenser lens 22 similar to the condenser lens 21 is formed in the received-light-transmitting portion formed outside the effective area of the end portion on the longitudinal opposite side of the condenser lens 21.

The light beam deflected by the optical deflector 3 is deflected from the side of the condenser lens 22 toward the side of the condenser lens 21 with respect to the scan image forming mirror 2. Therefore, the deflected light beam is focused by the condenser lens 22, while it is being transmitted through the received-light transmitting portion prior to scanning of a surface to be scanned, and then is incident on a photosensor 6 which is a synchronous light detecting means. The photosensor 6 is caused to generate a synchronous signal for optical scanning.

Figure 1C:
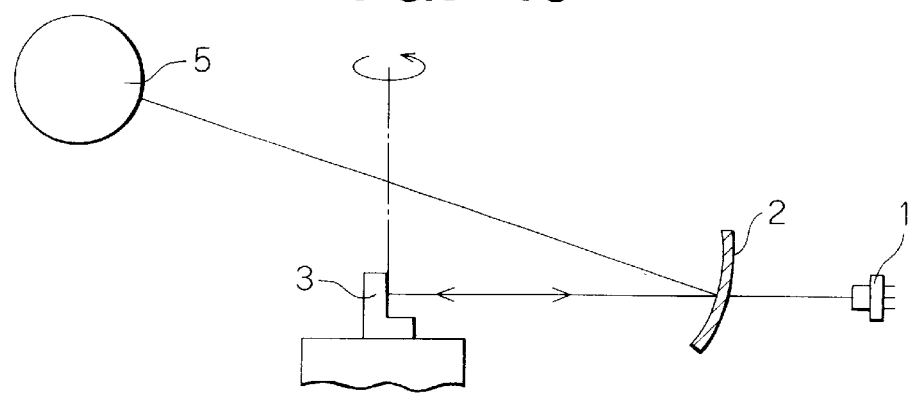

FIG. 1c shows the optical layout of FIG. 1a viewed in the aforementioned horizontal scan-corresponding direction. The light beam from the light source 1 is transmitted through the emitted-light transmitting portion (of the condenser lens 21) of the scan image forming mirror 2 and is incident on the deflecting-reflecting face of the optical deflector 3 so as to cross the rotation axis of the deflecting-reflecting face at a right angle. If the incident light is reflected by the deflecting-reflecting face, it will be deflected on a plane crossing the aforementioned rotation axis at a right angle and incident on the-reflecting face of the scan image forming mirror 2.

The optical axis of the scan image forming mirror 2 is tilted by a predetermined angle in the aforementioned vertical scan-corresponding direction with respect to the plane crossing the rotation axis of the deflecting-reflecting face at a right angle so that the reflected and deflected light beam is directed toward the surface to be scanned without being "kicked" by the optical deflector 3.

The material of the scan image forming mirror 2 is an optical plastic or the like.

Incidentally, the light condensing operation of the condenser lens 21 is not limited to the case where the divergent light beam from the light source 1 is changed to a collimated light beam, as in the above case. Depending upon the optical characteristic of the scan image forming mirror, the divergent light beam from the light source 1 may be converted into a weak divergent light beam or a convergent light beam by the condenser lens 21.

FIG. 2 shows another embodiment. To avoid complexity, the same reference numerals as FIG. 1 will be applied to parts where there is no possibility of confusion.

Figure 2A:
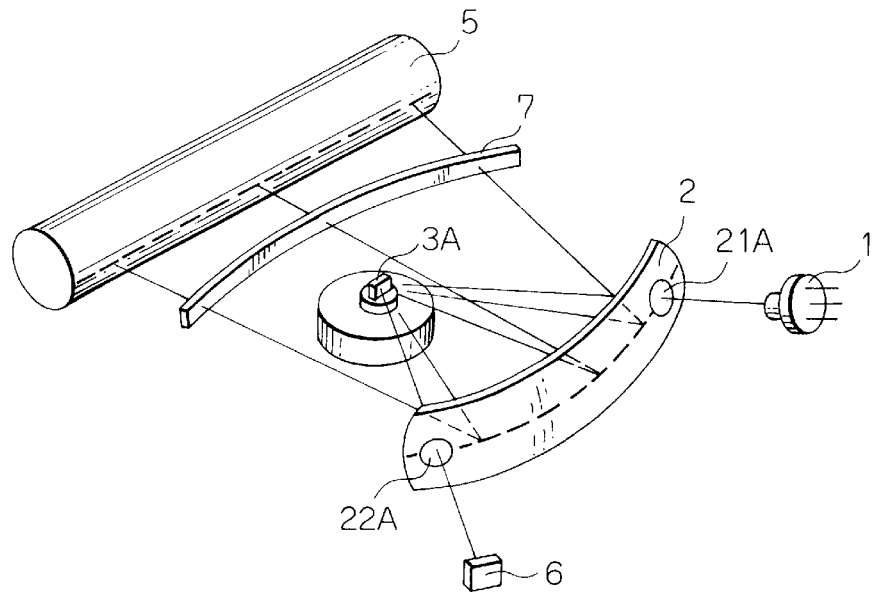
FIGS. 2a, 2b, 2c and 2d are diagrams for explaining another embodiment of the present invention.
Figure 2B:
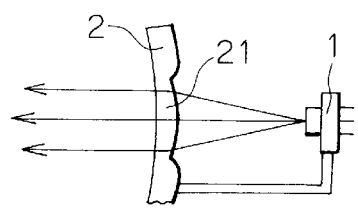
Figure 2C:
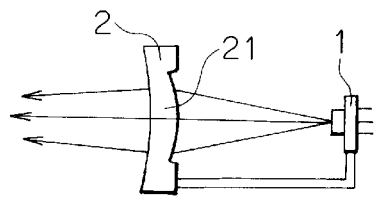

As shown in FIG. 2a, in this embodiment, a rotary two-plane mirror which is a sort of rotary polygon mirror is used as an optical deflector 3A and therefore "a fall of a surface" needs to be taken into consideration. For this reason, a condenser lens 21A formed in the emitted-light transmitting portion of a scan image forming mirror 2 is constituted by an anamorphic lens. For the horizontal scan-corresponding direction, as shown in FIG. 2b, a light beam from a light source 1 is changed to a collimated light beam, and for the vertical scan-corresponding direction, as shown in FIG. 2c, the light beam from the light source 1 is converged and formed on the deflecting-reflecting face of an optical deflector 3A as a line image longer in the horizontal scan-corresponding direction.

Figure 2D:
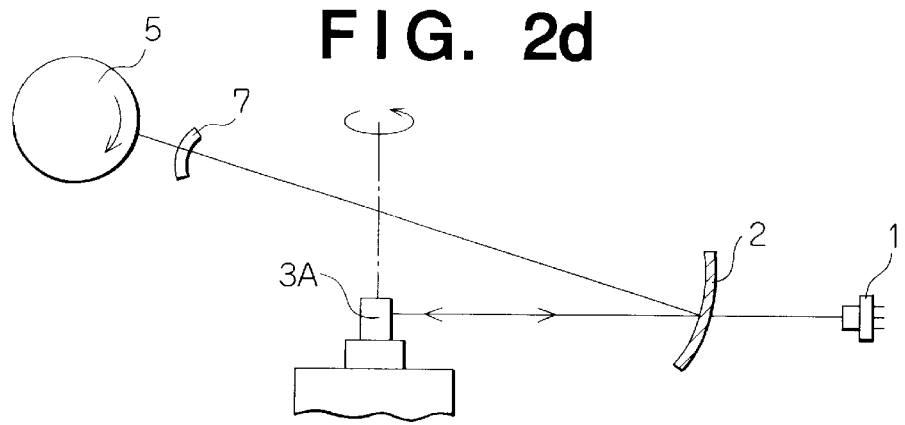

FIG. 2d shows the optical layout of FIG. 2a viewed in the horizontal scan-corresponding direction. The light beam from the light source 1 is transmitted through the emitted-light transmitting portion of the scan image forming mirror 2 and is incident on the deflecting-reflecting face of the optical deflector 3A so as to cross the rotation axis of the deflecting-reflecting surface at a right angle. If the incident light is reflected by the deflecting-reflecting face, it will be incident on the reflecting surface of the scan image forming mirror 2, while it is being deflected on a plane crossing the aforementioned rotation axis at a right angle.

The optical axis of the scan image forming mirror 2 is tilted by a predetermined angle in the vertical scan-corresponding direction with respect to the plane crossing the rotation axis of the deflecting-reflecting face at a right angle so that the reflected and deflected light beam is directed toward the surface to be scanned without being "kicked" by the optical deflector 3A.

The deflected light beam reflected by the scan image forming mirror 2 is focused as a light spot on the outer peripheral surface of the photosensitive body 5 through a long toroidal lens 7. That is, the long toroidal lens 7 and the scan image forming mirror 2 connect the position of the deflecting-reflecting face of the optical deflector 3 the position of and the surface to be scanned together as a conjugated relationship in the vertical scan-corresponding direction.

Incidentally, the condenser lens 21 may be a lens which converts the divergent light beam from the light source 1 into a weak divergent light beam or a convergent light beam with respect to the horizontal scan-corresponding direction.

As shown in FIG. 2a, in the scan image forming mirror 2, a condenser lens 22A similar to the condenser lens 21A is formed in the received-light transmitting portion formed outside the effective area of the end portion on the longitudinal opposite side of the condenser lens 21A. As with the embodiment of FIG. 1, the deflected light beam is focused by the condenser lens 22A, while it is being transmitted through the received-light transmitting portion prior to scanning of a surface to be scanned, and then is incident on a photosensor 6, which is caused to generate a synchronous signal for optical scanning.

As illustrated in FIGS. 2B and 2c, it is preferable to provide means for maintaining the positional relationship between the light source 1 and the scan image forming mirror 2.

FIG. 3 shows a modification of the embodiment of FIG. 2. Therefore, the same reference numerals as FIG. 2 will be applied to parts where there is no possibility of confusion.

Figure 3A:
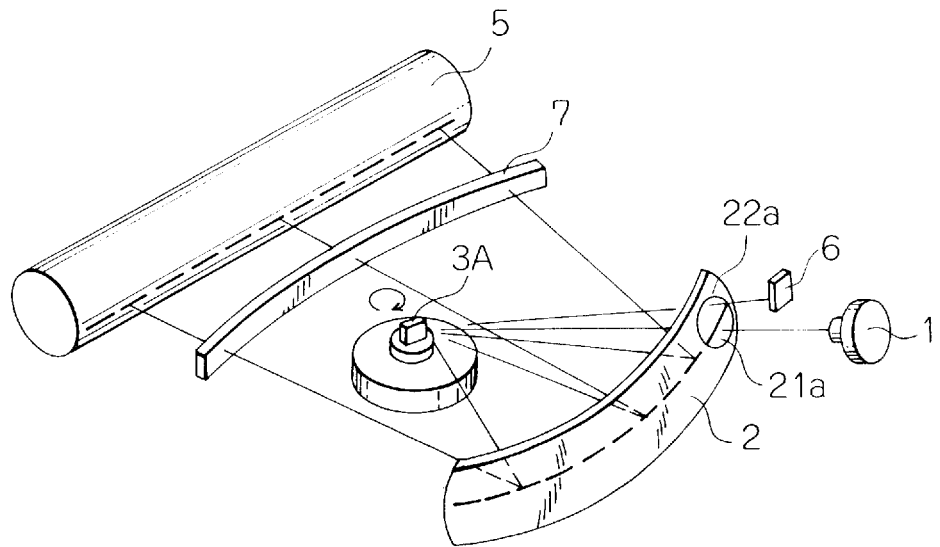
FIGS. 3a and 3b are diagrams for explaining still another embodiment of the present invention.

One of the features of this embodiment is that the direction of rotation of a rotary two-plane mirror which is an optical deflector 3A is opposite to that of the embodiment of FIG. 2. Therefore, as shown in FIG. 3a, a photosensor 6 which generates a synchronous signal for optical scanning is provided at the same side as a light source 1 in the longitudinal direction of a scan image forming mirror 2.

For this reason, the light transmitting portion of the scan image forming mirror 2 is shared by an emitted-light transmitting portion and a received-light transmitting portion, and anamorphic condenser lenses 21a and 22a are formed in this shared light transmitting portion.

Further, this construction enables to provide means for connecting the light source 1 and the photosensor 6 each other, or enables to integrate the light source 1 and the photosensor 6.

Figure 3B:
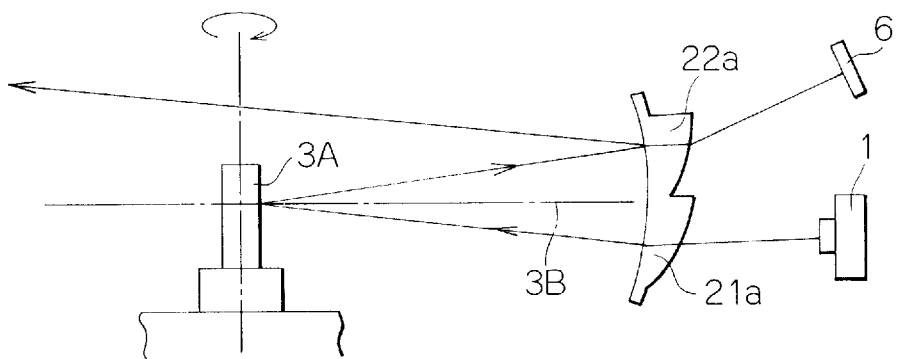

As shown in FIG. 3b, a light beam from a light source 1 is incident on the condenser lens 21a in the direction crossing the rotation axis of the deflecting-reflecting face of an optical deflector 3A at a right angle, but the optical axis of the condenser lens 21a is shifted to the upper side of FIG. 3b than the principle ray of the aforementioned incident light beam and is in the direction crossing the aforementioned rotation axis at a right angle.

For this reason, the light beam from the light source 1 is converted into a collimated light beam in the horizontal scan-corresponding direction and focused in the vertical scan-corresponding direction by the lens operation of the condenser lens 21a, while the orientation of the principal ray, as shown in FIG. 3b, is tilted with respect to a plane 3B crossing the rotation axis of the deflecting-reflecting face of the optical deflector 3A at a right angle, and the light beam from the light source 1 is formed at the position of the deflecting-reflecting face as a line image longer in the horizontal scan-corresponding direction.

Thus, the incident light beam is tilted with respect to the plane 3B, and consequently, the deflected light beam is also tilted with respect to the plane 3B in the vertical scan-corresponding direction and is incident on a scan image forming mirror 2. If the incident light beam is reflected by the scan image forming mirror 2, then the reflected light beam will be focused on a surface to be scanned through a long toroidal lens 7.

Of course, the deflected light beam is focused by the condenser lens 22a on a photosensor 6 prior to optical scanning, which is caused to generate a synchronous signal.

Figure 4:
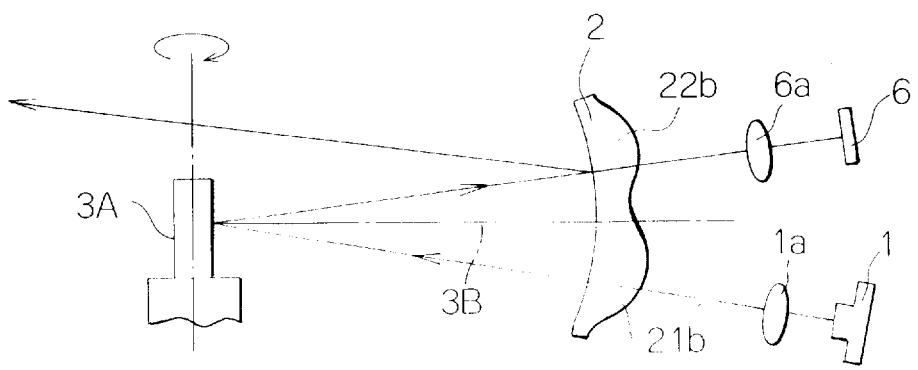
FIG. 4 is a diagram for explaining a further embodiment of the present invention.

FIG. 4 shows the characteristic parts of a modification of the embodiment of FIG. 3.

In this embodiment, condenser lenses 21b and 22b formed in the light transmitting portion of a scan image forming mirror 7 are constituted by positive cylinder lenses having no power in the horizontal scan-corresponding direction, and the optical axes are tilted with respect to a plane 3B crossing the rotation axis of the deflecting-reflecting face of an optical deflector 3A at a right angle.

The light beam from a light source 1 is first converted into a collimated light beam by a collimate lens 1a, and then the collimated light is focused in the vertical scan-corresponding direction by a condenser lens 21b and formed at the position of the deflecting-reflecting face as a line image longer in the horizontal scan-corresponding direction. The deflected light beam is again collimated by the condenser lens 22b prior to optical scanning and is focused by a condenser lens 6a on a photosensor 6, which is caused to generate a synchronous signal. Therefore, the collimated light beam is reflected by a scan image forming mirror 2 and focused as a spot light on a surface to be scanned (not shown) through a long toroidal lens (not shown), and optical scanning is performed.

Incidentally, if the condenser lenses 21b and 22b have power in the horizontal scan-corresponding direction, then the collimate lens 1a and the condenser lens 6a can be omitted. In this case, the condenser lens 21b may be a lens which converts the light beam emitted from the light source 1 into a divergent or convergent light beam.

In a case where a light beam from a light source, as in the embodiment of FIG. 3 or 4, is obliquely incident with respect to the plane 3B crossing the rotation axis of the deflecting-reflecting face of the optical deflector at a right angle, the light beam reflected by the optical deflector is separated in the vertical scan-corresponding direction from the incident light beam and therefore the emitted-light transmitting portion and the received-light transmitting portion are separated from each other in the vertical scan-corresponding direction on the scan image forming mirror.

Figure 5A:
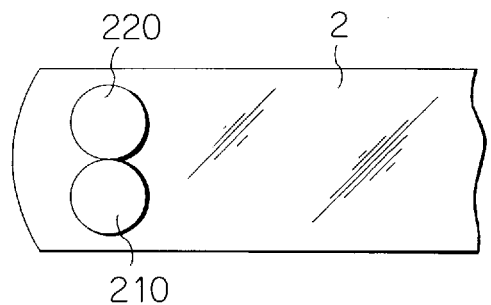
FIGS. 5a, 5b, and 5c are diagrams for explaining a positional relationship between an emitted-light transmitting portion and a received-light transmitting portion.
Figure 5B:
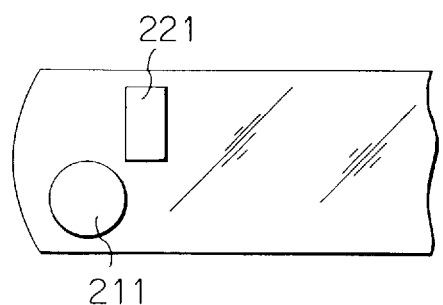
Figure 5C:
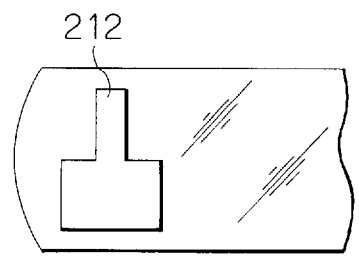

In the embodiment of FIG. 3, both light transmitting portions have been integrally formed as described above, but, when both light transmitting portions are formed on the same side of the scan image forming mirror, an emitted-light transmitting portion 210 and a received-light transmitting portion 220 may be formed so as to be separated from each other, as shown in FIG. 5a. Also, as shown in FIG. 5b, an emitted-light transmitting portion 211 and a received-light transmitting portion 221 may be separated from each other and the received-light transmitting portion 221 may be formed into a rectangular shape which is suitable for generating a synchronous signal. Furthermore, as shown in FIG. 5c, an emitted-light transmitting portion and a received-light transmitting portion may be formed as a single light transmitting portion 212.

In each embodiment described above, condenser lenses are formed in both the emitted-light transmitting portion and the received-light transmitting portion. In this case, a separate condenser lens may be secured to the scan image forming mirror, or the scan image forming mirror and the condenser lens may be integrally formed from the beginning. Of course, the light transmitting portion itself may be an opening portion or a transparent portion. Also, the condenser lens may be provided on the light source side or photosensor side so that the light beam passed through the condenser lens is irradiated to the optical deflector through the emitted-light transmitting portion and that the light beam transmitted through the received-light transmitting portion is focused on the photosensor by the condenser lens.

While the synchronous light detecting means, as in each embodiment described above, may be separated from the scan image forming mirror and provided on the back side of the scan image forming mirror, the detecting means may also be provided at the received-light transmitting portion of the scan image forming mirror itself.

Figures 6A, 6B, 6C:
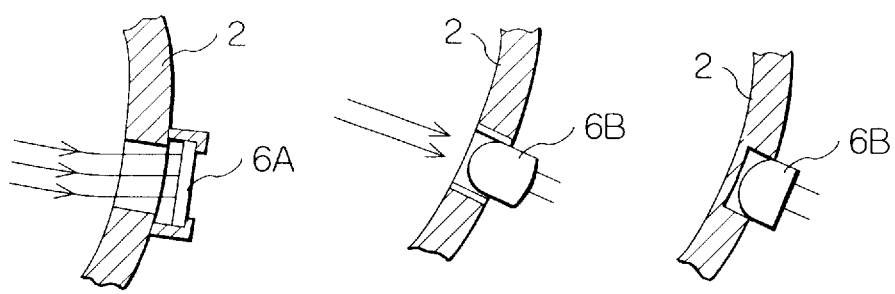
FIGS. 6a, 6b, and 6c are diagrams for explaining a synchronous light detecting means provided at the emitted-light transmitting portion of a scan image forming mirror.

As a providing method such as this, as shown in FIG. 6a, a photosensor 6A may be permanently attached to the back surface portion of the scan image forming mirror 2 at the received-light transmitting portion of the scan image forming mirror 2. As shown in FIG. 6b, a light receiving device 6B may be fitted into and fixed to a through hole (received-light transmitting portion) of the scan image forming mirror 2. As shown in FIG. 6c, a light receiving device 6B may be fitted into and fixed to a blind hole formed in the scan image forming mirror 2 as the received-light transmitting portion.

Incidentally, because the anamorphic scan image forming mirror, which has a function whereby the position of the deflecting-reflecting face and the position of the surface to be scanned are connected as a conjugate relationship, is used in the embodiments described along FIGS. 2 through 4, the aforementioned long toroidal lens can be omitted.

In addition, if, in the embodiments described along FIGS. 1 through 4, fine adjustment in the direction of the optical axis can be made for the position of the light source, the spot diameter of the light spot can be easily adjusted with this fine adjustment.

As has been described hereinabove, a novel optical scanner can be provided at accordance with the present invention. Because the optical scanner of the present invention is constructed as described above, the degree of freedom of the layout of the light source and the synchronous light detecting means can be increased while effectively reducing the floor area of the optical scanner with the scan image forming mirror.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optical scanner comprising:
   a light source for emitting a light beam;
   an optical deflector having a deflecting-reflecting face for deflecting the light beam emitted from said light source at a constant angular speed;
   a scan image forming mirror for reflecting the light beam deflected by said optical deflector to a surface to be scanned at a constant speed;
   a light detecting means for detecting a start of the optical scanning and generating a synchronous signal of the optical scanning;
   wherein said light source and said light detecting means are opposite to said optical deflector with respect to said scan image forming mirror, said scan image forming mirror is provided with an emitted-light transmitting portion at one end in the longitudinal direction outside of an effective area thereof for transmitting the light beam emitted from said light source toward said deflecting-reflecting face there-through and a received-light transmitting portion at the other end in the longitudinal direction outside of the effective area thereof for transmitting the deflected light beam from said optical deflector toward said light detecting means there-through, and said optical deflector is a rotary single surface mirror having no fall of a surface.

2. The optical scanner according to claim 1, wherein a lens for focusing the light beam transmitted through said received-light transmitting portion toward said light detecting means is provided at said received-light transmitting portion.

3. The optical scanner according to claim 1, wherein said light detecting means is provided at said received-light transmitting portion.

4. The optical scanner according to claim 1, wherein said light source and said light detecting means are formed integrally.

5. The optical scanner according to claim 1, wherein a lens for converging a divergent light beam emitted from said light source is provided at said emitted-light transmitting portion of said scan image forming mirror.

6. The optical scanner according to claim 5, wherein an optical axis of said lens provided at said emitted-light transmitting portion is parallel to a plane crossing a rotation axis of the deflecting-reflecting face at a right angle and said light source is shifted from said optical axis so that the light beam transmitted through said lens is tilted at a predetermined angle with respect to said plane.

7. The optical scanner according to claim 5, wherein said light source is adjustable in a direction of an optical axis of the lens provided at said emitted-light transmitting portion.

8. The optical scanner according to claim 5, wherein said scanner further comprises means for connecting said light source and said lens.

9. The optical scanner according to claim 1, wherein the material of said scan image forming mirror is an optical plastic.

10. An optical scanner comprising:

a light source for emitting a light beam;

a rotary polygon mirror having a plurality of deflecting-reflecting faces each for deflecting the light beam emitted from said light source at a constant angular speed;

a scan image forming mirror for reflecting the light beam deflected by said rotary polygon mirror to a surface to be scanned at a constant speed;

a light detector for detecting a start of the optical scanning and generating a synchronous signal of the optical scanning; and a long lens between said rotary polygon mirror and the surface to be scanned for correcting a fall of said deflecting-reflecting face;

wherein said light source and said light detector are opposite to said rotary polygon mirror with respect to said scan image forming mirror, said scan image forming is provided with an emitted-light transmitting portion at one end in the longitudinal direction outside of an effective area thereof for transmitting the light beam emitted from said light source toward said rotary polygon mirror there-through and a received-light transmitting portion at the other end in the longitudinal direction outside of the effective area thereof for transmitting the deflected light beam from said rotary polygon mirror toward said light detecting means therethrough.

11. The optical scanner according to claim 10, wherein an anamorphic lens is provided at said emitted-light transmitting portion of said scan image forming mirror, the anamorphic lens changing a divergent light beam emitted by said light source to a collimated light beam or a diverged or converged light beam in said horizontal scanning direction and converging the light beam in a vertical scanning direction so that the light beam is formed on said deflecting-reflecting face of said rotary polygon mirror as a line image longer in the horizontal scan-corresponding direction.

12. The optical scanner according to claim 11, wherein an optical axis of said lens provided at said emitted-light transmitting portion is parallel to a plane crossing an rotation axis of the deflecting-reflecting face at a right angle and said light source is shifted from said optical axis so that the light beam transmitted through said lens is tilted at a predetermined angle with respect to said plane.

13. The optical scanner according to claim 11, wherein said light source is adjustable in a direction of an optical axis of the lens provided at said emitted-light transmitting portion.

14. The optical scanner according to claim 11, wherein said scanner further comprises means for connecting said light source and said lens.

15. An optical scanner comprising:

light source means for emitting a light beam;

deflecting-reflecting means having a plurality of deflecting-reflecting faces each for deflecting the light beam emitted from said light source means at a constant angular speed;

scan image forming means for reflecting the light beam deflected by said deflecting-reflecting means to a surface to be scanned at a constant speed;

light detecting means for detecting a start of the optical scanning and generating a synchronous signal of the optical scanning; and means for correcting a fall of said deflecting-reflecting face provided between said deflecting-reflecting means and the surface to be scanned;

wherein said light source means and said light detecting means are opposite to said deflecting-reflecting means with respect to said scan image forming means, said scan image forming means is provided with an emitted-light transmitting portion at one end in the longitudinal direction outside of the effective area thereof for transmitting the light beam emitted from said light source means toward said deflecting-reflecting means therethrough and a received-fight transmitting portion at the other end in the longitudinal direction outside of the effective area thereof for transmitting the deflected light beam from said deflecting-reflecting means toward said light detecting means there-through.

* * * * *